March 29, 1966 E. O. BLODGETT 3,243,533

POWER DRIVE SUPPORT STRUCTURE

Original Filed Nov. 15, 1955 5 Sheets-Sheet 1

INVENTOR.
EDWIN O. BLODGETT

BY John A. Harvey

ATTORNEY

POWER DRIVE SUPPORT STRUCTURE

Original Filed Nov. 15, 1955 5 Sheets-Sheet 2

INVENTOR
EDWIN O. BLODGETT
BY John A. Harvey
ATTORNEY

March 29, 1966 E. O. BLODGETT 3,243,533

POWER DRIVE SUPPORT STRUCTURE

Original Filed Nov. 15, 1955 5 Sheets-Sheet 3

*INVENTOR.*
EDWIN O. BLODGETT
*BY* John A. Harvey
ATTORNEY

March 29, 1966 E. O. BLODGETT 3,243,533

POWER DRIVE SUPPORT STRUCTURE

Original Filed Nov. 15, 1955 5 Sheets-Sheet 5

*INVENTOR.*

EDWIN O. BLODGETT

*BY* John A. Harvey

ATTORNEY

United States Patent Office 3,243,533

Patented Mar. 29, 1966

3,243,533

POWER DRIVE SUPPORT STRUCTURE

Edwin O. Blodgett, Rochester, N.Y., assignor to Friden, Inc., San Leandro, Calif., a corporation of Delaware Application Mar. 2, 1959, Ser. No. 796,682, now Patent No. 3,084,857, Apr. 9, 1963, which is a division of application Ser. No. 546,902, Nov. 15, 1955, now Patent No. 2,927,158, dated Mar. 1, 1960. Divided and this application Jan. 28, 1963, Ser. No. 254,188
8 Claims. (Cl. 200—46)

The present application is a division of application Serial No. 796,682, filed March 2, 1959, and entitled, "Motorized Reader for Record Media," now U.S. Patent No. 3,084,857, granted April 9, 1963, which application in turn is a division of U.S. Patent No. 2,927,158, granted March 1, 1960, on an application filed November 15, 1955 to Edwin O. Blodgett and entitled, "Code-Form Converter."

The present invention relates to a power drive and support structure for coded information recorders and readers used respectively to record in and drive from a record medium data infomation represented by use of a code employing a preselected maximum number of code bits arranged in combinational groups, each such group representing an information item such as an alphabetic character, a number, a symbol, or even an operational function desired in effecting printing of the information. While the invention is of general application, it is particularly suited for use with punched tape equipments and will be described in that connection.

There are many present-day applications where information is recorded in punched tape by use of an appropriate punch code. These punched tape records are then used to control the operations of code transmitters for purposes of transmitting the information to a remote point, to control the operations of printers for purposes of printing the information, to supply information to computers, and for numerous other well known purposes. The tape punch unit and tape reader unit used to prepare and read these punched tapes may have any of a large number of various proposed constructions most of which, however, contemplate that the punch and reader units shall form a component of and be driven by the machine with which the unit is used.

It would be desirable to have relatively compact, rugged and inexpensive motorized punch and reader units adaptable with minimum constructional changes to various and diverse types of application while housing certain control-system components required in such applications. Further, and to enhance the desired high rate of information recording and reading, it would be desirable that the motorized drive control of the coded-information recorder and reader units be accomplished in an exceptionally rapid and precise manner consistently accurate and reliable over long operating periods and without requiring significant maintenance attention. These several desirable characteristics present rather severe constructional and operational problems. This is especially true in regard to the necessarily relatively sensitive code reader unit, which often must not only possess a reading rate higher than that of the recorder unit but must also permit reading and temporary storage of each read code awaiting its utilization by the recorder unit or by associated equipment and yet must accomplish such storage in a simple yet reliable manner and one characterized by high operational precision.

It is an object of the present invention to provide a novel motor drive and support structure for coded-information recorder and reader units, and one having a relatively inexpensive, rugged and compact construction readily adaptable with a minimum of simple constructional changes to numerous and diverse types of application including a suitable housing for many or all of the control-system components required in such applications.

It is a further object of the invention to provide a new and improved motor drive and support structure particularly suited for punched-tape recorder and reader units which are required to operate at a high rate of information translation and with high opreational precision.

Other objects and advantages of the invention will appear as the detailed description proceeds in the light of the accompanying drawings forming a part of this application and in which:

FIG. 1 illustrates a punched-tape reader unit R, which derives coded-information recorded on a punched tape and supplies such information to a tape punch unit P to re-record the information in a new punched tape. Both the reader and punch units embody the present invention.

Figure 1:
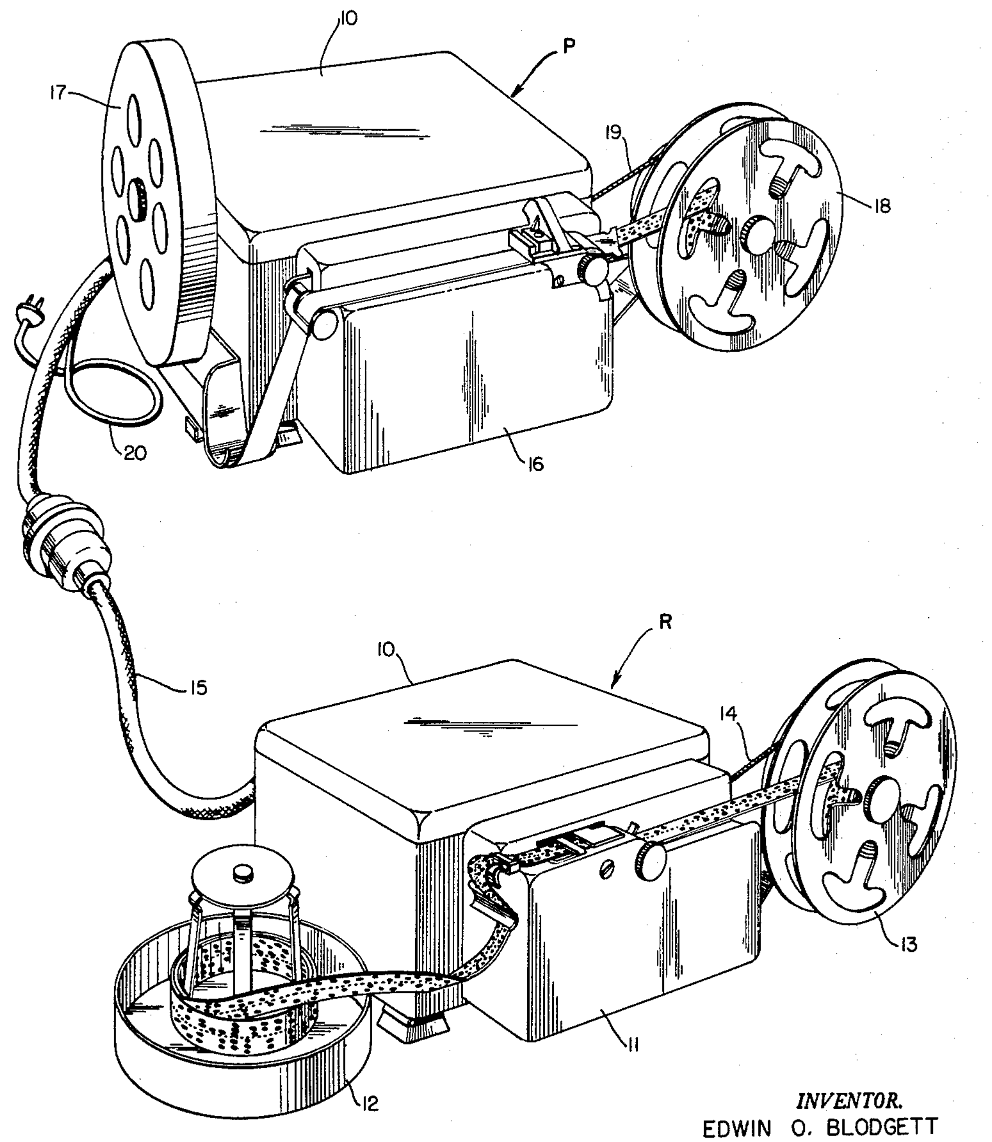
FIG. 1 illustrates electrically interconnected motorized punched-tape recorder and reader units embodying the present invention.

The reader and punch units here illustrated both are of the motorized type having a motorized housed assembly 10, hereinafter described in detail. The reader motorized assembly includes a motor which is mechanically connected through an electromagnetically controlled clutch to drive a punched tape reader structure 11 operating to read the information recorded on a punched tape. To facilitate handling long lengths of such tape, a rotatable tape reel 12 receives the roll of tape to be read, and the tape after passing through the reader structure 11 is wound onto a take-up reel 13 driven by a spring belt 14 from the drive shaft of the motorized assembly 10.

This motorized reader unit R reads the information recorded on the tape and transmits it by means of an electrical cable 15 to the punch unit P which similarly includes a motorized housed assembly 10 having an electric motor mechanically connected through an electromagnetically operated clutch to drive a punch structure 16. The punch structure 16 re-records the information by punching a blank tape supplied from a tape reel 17 through the punch unit 16 to a take-up reel 18 driven by a spring belt 19 from the motorized assembly 10.

The constructions of the motorized assembly 10 of both the tape reader unit R and punch unit P will be shown and described in detail hereinafter and are essentially similar differing only in minor details. A suitable construction for both the tape reader structure 11 and punch structure 16 are shown and described in detail in the aforementioned patent. Each such assembly includes a suitable drive motor belt-connected through an electromagnetically controlled clutch to a drive shaft which drives the reader structure 11 or punch structure 16. Each motorized assembly may include one or more cam actuated contacts mechanically driven from the drive shaft of the assembly, may include one or more circuit control relays, and may also include a power supply for its own energization and if desired for energization of the associated motorized unit. Energization of the power supply and motor of the motorized assembly is conventionally from 110 volt or equivalent power line supply through a flexible power cord 20. Both units may have a cord 20 or one may be provided with a cord 20 and the other receive its supply through the cable 15.

Figure 2:
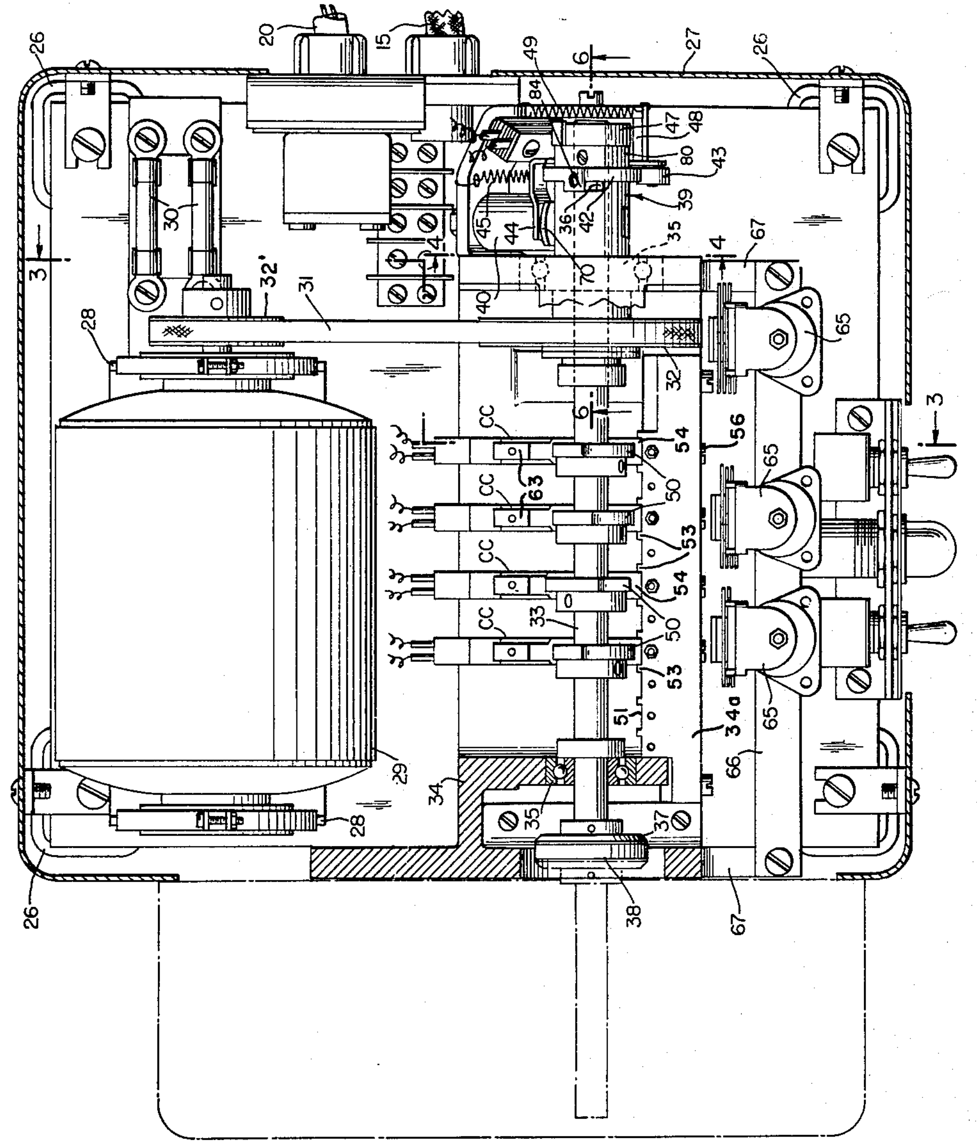
FIGS. 2 and 3 illustrate in respective plan and elevational views a typical construction of the motor drive and support structure of the invention.
Figure 3:
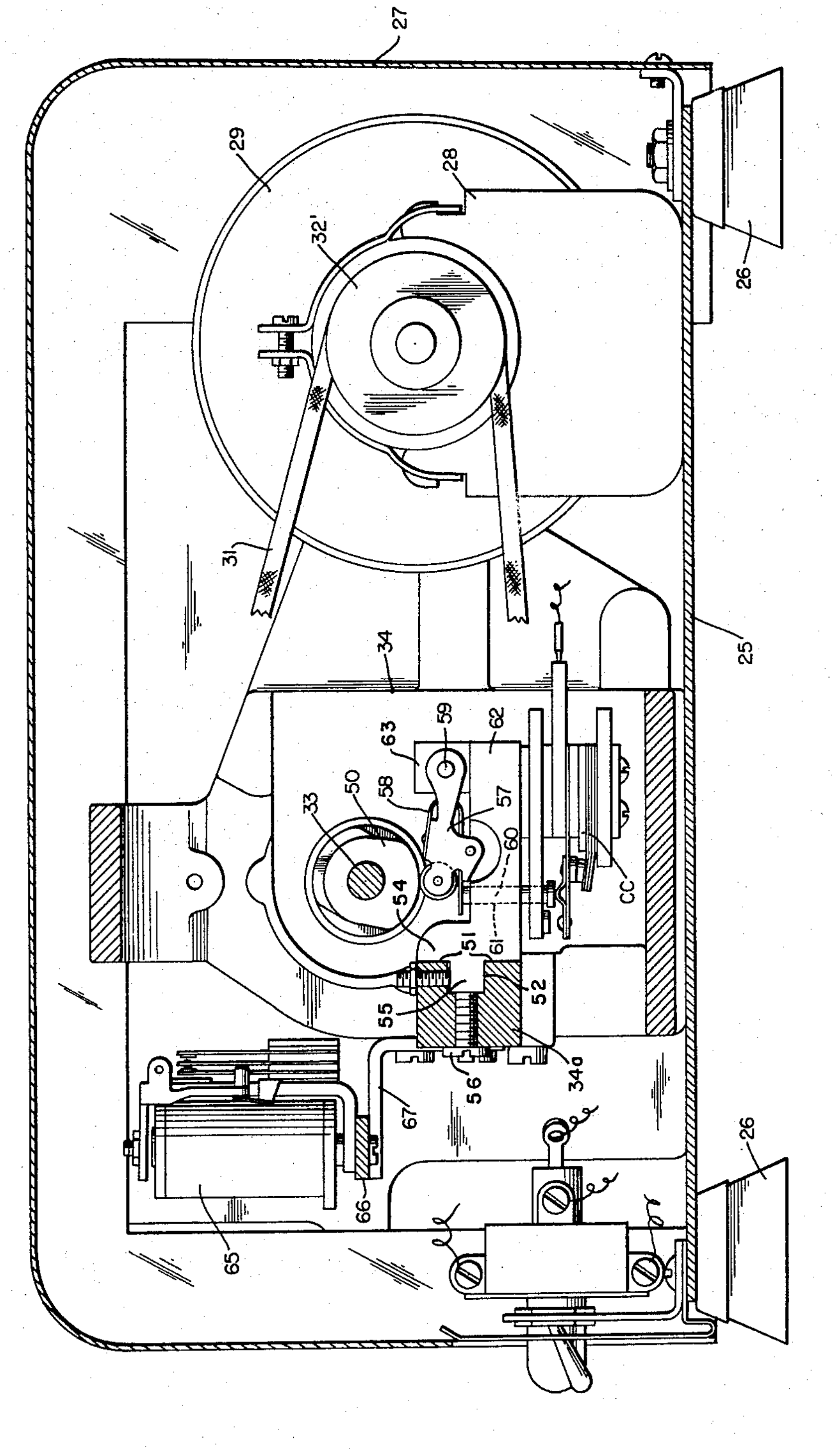

FIG. 2 is a plan view and FIG. 3 an elevational view illustrating the construction of the motorized assembly. It includes a base plate 25 supported upon resilient feet 26, and is enclosed within a metallic housing 27. Supported on the base plate 25 by support trunnions 28 is an electric drive motor 29 energized through fuses 30 either from the power cord 20 or through the cable 15 from another similar motorized assembly as earlier mentioned. The motor 29 is mechanically connected by a motor pulley 32′ and a belt 31 to a further drive pulley 32 rotatably journalled upon a drive shaft 33. The drive shaft 33 is supported, directly at its left-hand end as seen in FIG. 2 and indirectly at its right-hand end through the extended hub end 82 (FIG. 6) of the pulley 32, by ball bearings 35, 35 in opposed end walls of a very rigid, sturdy, open support frame casting 34 having rectangular box cross-section. The shaft 33 is provided at one end with one flange 37 of a flexible coupling 38 through which the associated reader structure or punch structure is driven. The other end of the shaft 33 has positioned thereon a clutch 39 which is controlled by an electromagnet 40, the clutch 39 being driven by the pulley 32 and being effective under control of the electromagnet 40 mechanically to couple the pulley 32 to the drive shaft 33. The clutch 39 has one of two forms depending upon whether the motorized assembly 10 is used with a tape reader structure or a tape punch structure, and both forms of clutch are shown and described in detail hereinafter. A cam 42 is fixed by a set screw to the drive shaft 33, includes two opposed and radially disposed keys 84 engaging individual ones of two elongated circumferential slots 36 in the clutch housing, and is engaged by a cam follower 43. The latter actuates a pivoted armature knock-off arm 44 normally biased by a spring 45 out of engagement with the armature even when the latter is in its energized position. The knock-off arm has an inturned end and is cam-actuated against the bias of the spring 45 to engage the armature, if the latter should remain in its energized position, and thus move it forcibly to its de-energized position.

Fixed to the end of the shaft 33 is a detent 47 engaged by a keeper 48 spring biased into detent engagement by a spring 49.

There are fixed to the shaft 33 in spaced relation along its length a plurality of cams 50 which may vary in number from three to six depending upon the use of the motorized assembly. The cams 50 actuate individual contactors CC used for circuit control purposes, as described in the aforementioned patent, during preselected angles of rotation of the shaft 33 as determined by the contour of any given cam. As shown more clearly in FIG. 3, each of the cams 50 is engaged by a cam follower 57 which is biased into cam engagement by a spring 58, the cam followers being pivoted at 59 and actuating the contacts CC through a push rod 60 slidably mounted in an aperture 61 of a rigid bar member comprised by a casting 62 having an integral upstanding stud 63 of rectangular cross-section in both vertical and horizontal planes and providing a support upon which the cam follower 57 is pivotally mounted. The casting 62 provides a unitary assembly which includes a cam follower with associated push rod and contacts, and is itself secured at its forward end to a transverse connecting bar 34*a* which forms an integral part of the casting 34 and extends transversely between the end walls of the latter. In particular, the bar 34*a* has an inner face 51 provided with a longitudinal groove 52 and transverse spaced ribs 53, and the casting 62 is provided with an elongated foot portion 54 which is received between and is oriented by adjacent ribs 53 of the bar 34*a*. The end of the foot portion 54 has a projecting centrally-positioned locating tongue 55 of rectangular vertical cross-section which is received within the longitudinal groove 52 of the bar 34*a* vertically to locate the casting 62 on the bar 34*a* and thus precisely locate the contact assembly in spaced relation to its associated cam 50. The casting 62 is secured to the bar 34*a* by a machine screw 56 threaded into the tongue 55.

When the motorized assembly is used to drive a tape reader structure, a plurality of system control relays 65 are conveniently supported upon a bar 66 secured by brackets 67 to the casting 34.

Figure 4:
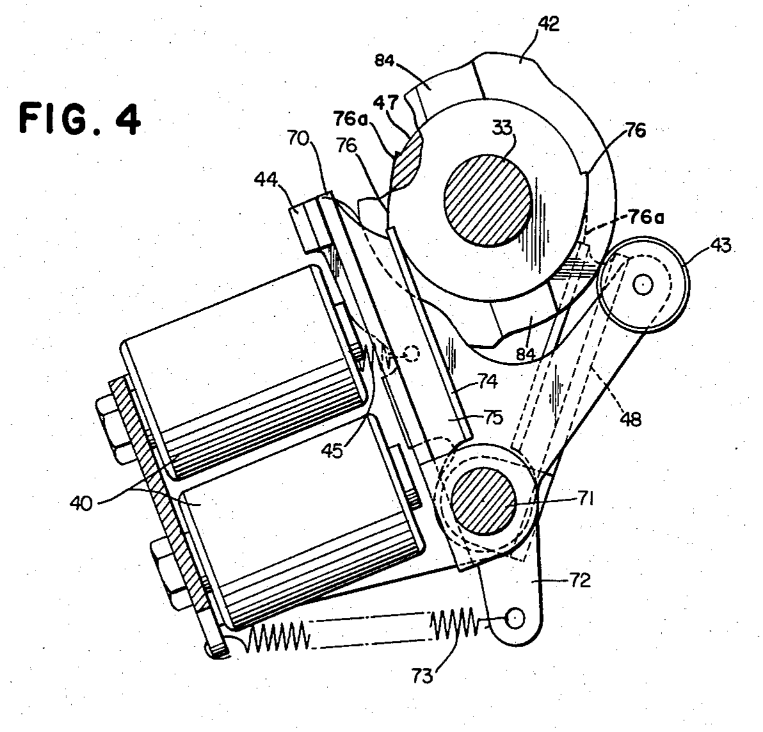
FIGS. 4, 5, 6 and 7 illustrate two forms of clutch construction which may be employed in the motorized assembly.
Figure 5:
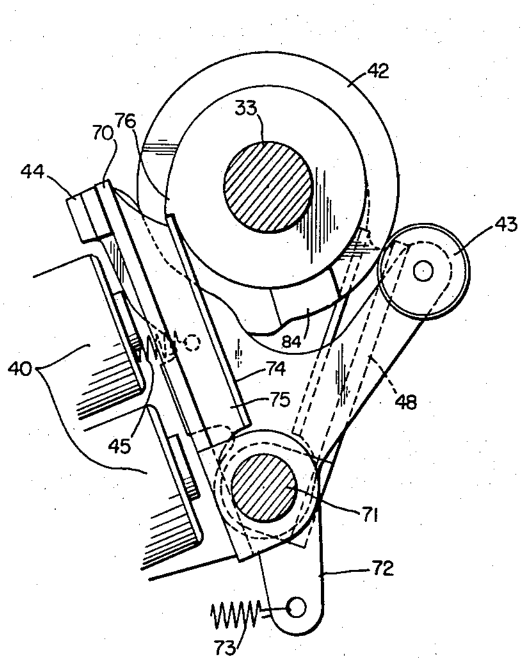
Figure 6:
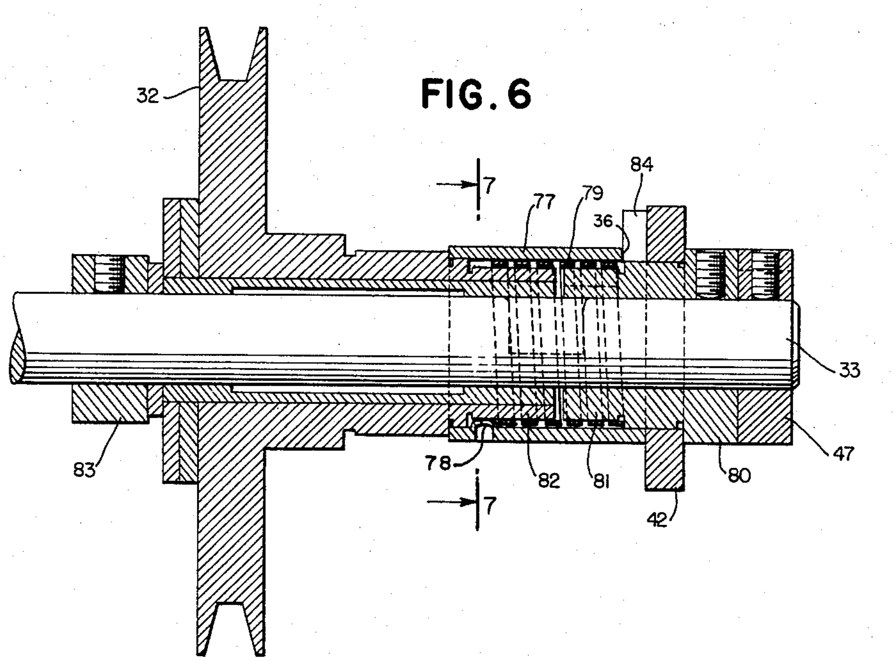
Figure 7:
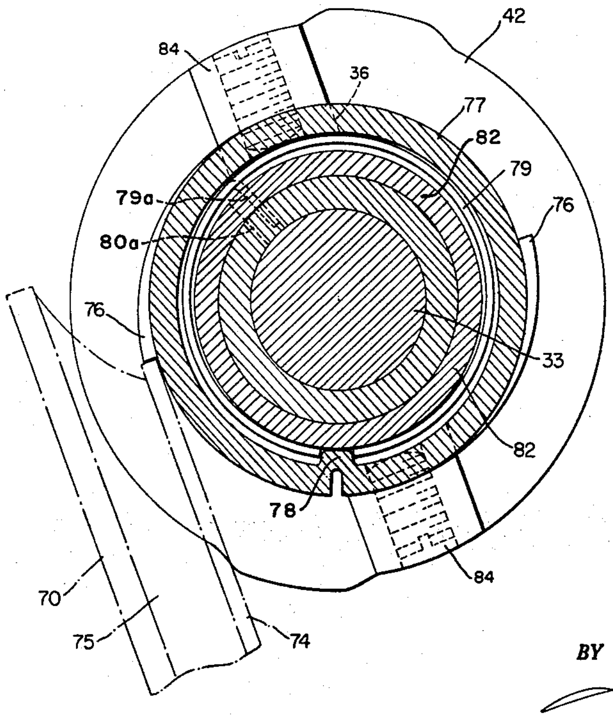

FIG. 4 illustrates the construction of the clutch 39 used in the motorized assembly when the latter drives a tape reader structure, and FIG. 5 the clutch construction when the motorized assembly drives a tape punch structure. FIG. 6 illustrates in cross-section the construction of both forms of clutch, and FIG. 7 is an enlarged cross-sectional view of the clutch used with the tape reader structure. Both forms of clutch are essentially similar with the difference that the tape reader clutch is arranged to be declutched at each 180° of rotation of the drive shaft 33 whereas the tape punch clutch is arranged to declutch at each 360° of rotation of the drive shaft.

Each form of clutch includes an armature 70 pivoted on a fixed shaft 71 and including an extended arm 72 which is engaged by a spring 73 to bias the armature to deenergized position where a detent plate 74, supported from the armature 70 by a bonded resilient rubber block 75, engages clutch detent protuberance 76 provided on the periphery on the clutch housing 77. It will be noted from FIGS. 4 and 7 that the reader clutch includes two such clutch detent protuberances 76, 76 and that there are two similar detents 76*a*, 76*a*, on the member 47 engaged by the keeper 48. The punch clutch, on the other hand, includes only one detent protuberance 76 and there is only one detent on the member 47 engaged by the keeper 48. As shown more clearly in FIGS. 6 and 7, each form of clutch is otherwise of conventional helical spring construction in which a helical spring 79 has one end engaging an inward projection 78 of the clutch housing 77 and has the other end anchored by a hooked end 79*a* which projects into an end slot 80*a* of a bushing 80 fixed to the drive shaft 33. The bushing 80 has an end 81 extending within the helical spring 79 in opposing relation to the extended end 82 of the pulley 32 which is journalled to rotate freely upon the shaft 33, the pulley being retained in position longitudinally of the shaft by a collar 83 fixed to the shaft.

As mentioned above, the cam 42 includes two keys 84 which engage circumferentially elongated slots 36 in the clutch housing 77 for mechanically limiting the overtravel rotation of the drive shaft relative to the clutch housing. Set screws are provided for adjustably positioning the cam 42 on the bushing 80, and the latter also is provided with set screws by which its angular position may be adjusted relative to the peripheral stop detents 76 on the clutch housing to provide proper clutch action between the stop detents and the drive shaft 33. Similarly, the detent 47 is provided with set screws by which angularly to position the zero or home position of the drive shaft 33 relative to the angular declutching position of the clutch 39.

In considering briefly the clutch operation, assume that the clutch has just been released by energization of the clutch magnet 40 to move the detent plate 74 out of engagement with a detent protuberance 76. Upon release of the detent protuberance, the clutch housing 77 is rotated forward through a small angle by the tensioned spring 79 and the elongated slots 36 in the clutch housing permits this movement without engaging the rear end of the slot with the key 84 of the cam 42. This movement of the clutch housing 77 permits the helical spring frictionally to grip the ends 81 and 82 of the respective bushing 80 and pulley 32 and thereby impart driving force from the pulley 32 to the bushing 80 and drive shaft 33. The clutch housing 77 is subsequently stopped by engagement of the detent plate 74 with a detent protuberance 76, but the momentum of the drive shaft 33 and components fixed thereto causes the shaft 33 to continue movement until the keys 84 strike the forward ends of the slots 36 of the now stationary clutch housing 77. This continued movement of the shaft 33 causes the bushing 80 to unwrap the spring 79 from the ends 81 and 82 of the bushing 80 and pulley 32, thus eliminating the frictional gripping force of the spring and terminating the driving connection. The stopping action on the shaft 33 is accordingly somewhat cushioned by the deceleration of the shaft as a part of its momentum is converted into tensioning of the helical spring 79. After being brought to a stop by engagement of the keys 84 with the ends of the slots 36, the tensioned spring 79 causes the shaft 33 to rotate backward a slight amount to engage the detent 47 with the keeper 48 at the zero or home position of the drive shaft 33.

The tape punch or reader structure is mounted rigidly upon the flared end of the motorized assembly casting 34 (as indicated in broken lines in FIG. 2) by machine screws which pass through a base casting of the punch or reader structure and are threaded into the casting 34.

The unitary assembly thus provided is a very rigid one enabling the establishment and maintenance of precise coaxial alignment of the drive shaft of the tape punch or reader unit with the drive shaft 33 and ensuring smooth, vibrationless, high-speed, intermittent drive of the tape unit. Whatever inertial short-term accelerating and decelerating forces are encountered in the repetitive start-and-stop clutched character of drive of the tape unit are easily handled without significant strain by the exceptional rigidity of this unitary assembly. Further, the structure insures long-term precision and consistency of operation of the cam-actuated contactors CC and precise consistent control of the angular stop position or positions of the driven elements.

While a specific form of invention has been described for purposes of illustration, it is contemplated that numerous changes may be made without departing from the spirit of the invention.

I claim:

1. A power drive support structure comprising a power rotational drive source, a rigid frame support casting having at least two opposed rigid walls rigidly spaced by at least one transverse rigid connecting casting portion and including an exterior wall surface adapted rigidly to support and fixedly to mount a power translating device having a rotatable driven shaft, a drive shaft adapted to be mechanically coupled to said driven shaft, means for rotationally supporting said drive shaft in opposed and aligned apertures of said walls and including a quick-acting clutch for mechanically connecting and disconnecting said source and said drive shaft for clutch-controlled rotational drive thereof by said source, a cam member on said drive shaft, and a unitary cooperating cam-follower-actuated electrical contact structure rigidly supported on and fixedly located by said transverse portion of said casting for enabling precise electrical circuit control in relation to at least one preselected rotational position of said drive shaft.

2. A power drive support structure comprising a power rotational drive source, a rigid frame support casting having at least two opposed rigid parallel walls rigidly spaced by at least one integrally-cast transverse rigid connecting casting portion and including an exterior planar wall surface adapted rigidly to support and fixedly to mount a power translating device having a rotatable driven shaft normal to said wall surface, a drive shaft, means for rotationally supporting said drive shaft in opposed apertures of said walls coaxially aligned with said driven shaft and including a quick-acting clutch for mechanically connecting and disconnecting said source and said drive shaft for clutch-controlled rotational drive thereof by said source, coupling means adapted mechanically to couple said drive and driven shafts in coaxial relation, a cam member on said drive shaft, and a unitary cooperating cam-follower-actuated electrical contact structure rigidly supported on and fixedly located by said transverse portion of said casting for enabling precise electrical circuit control in relation to at least one preselected rotational position of said drive shaft.

3. A power drive support structure comprising a base member, a power rotational drive source secured to said member, a rigid frame support casting secured to said member in spaced relation to said drive source and having at least two opposed rigid walls rigidly spaced by at least one rigid and surface-grooved transverse connecting casting portion and including an exterior wall surface adapted rigidly to support and fixedly to mount a power translating device having a rotatable driven shaft, a drive shaft adapted to be mechanically coupled to said driven shaft, means for rotationally supporting said drive shaft in opposed and aligned apertures of said walls and including a quick-acting clutch having a clutch element mechanically belt driven from said source for mechanically connecting and disconnecting said source and said drive shaft for clutch-controlled rotational drive thereof by said source, a cam member on said drive shaft, and a unitary cooperating cam-follower-actuated electrical contact structure rigidly supported on and fixedly located by a surface groove of said transverse portion of said casting for enabling precise electrical circuit control in relation to at least one preselected rotational position of said drive shaft.

4. A power drive support structure comprising a power rotational drive source, a rigid frame support casting having at least two opposed rigid walls rigidly spaced by at least one ribbed transversely connecting rigid-casting portion and including an exterior wall surface adapted rigidly to support and fixedly to mount a power translating device having a rotatable driven shaft, a drive shaft adapted to be mechanically coupled to said driven shaft, means for rotationally supporting said drive shaft in opposed and aligned apertures of said walls and including a quick-acting clutch for mechanically connecting and disconnecting said source and said drive shaft for clutch-controlled rotational drive thereof by said source, a plurality of cam members spaced longitudinally along said drive shaft, and a plurality of unitary cam-follower-actuated electrical contact structures rigidly supported in spaced relation on and oriented by the ribs of said transverse portion of said casting for operative drive by individual ones of said cam members to enable precise plural electrical-contact circuit control operations to be effected at preselected rotational positions of said drive shaft.

5. A power drive support structure comprising a power rotational drive source; a rigid frame support casting having at least two opposed rigid walls rigidly spaced by at least one transversely ribbed rigid connecting casting portion and including on one said wall an exterior planar wall surface adapted rigidly to support and fixedly to mount a power translating device having a rotatable driven shaft positioned substantially perpendicular to said planar wall surface; a drive shaft adapted to be mechanically coupled to said driven shaft in substantially coaxial relation therewith; means for rotationally supporting said drive shaft by bearing structures supported in opposed apertures of said walls coaxially aligned with said driven shaft and including a quick-acting clutch for mechanically connecting and disconnecting said source and said drive shaft for clutch-controlled rotational drive thereof by said source; a plurality of cam members supported in longitudinally spaced relation on said drive shaft, and a plurality of unitary cam-follower-actuated electrical contact structures rigidly supported in spaced relation on, and transversely oriented by the ribs of, said transversely ribbed connecting portion for operative cam-follower drive by individual ones of said cam members to enable plural precise electrical-contact circuit control operations to be effected at preselected rotational positions of said drive shaft.

6. A power drive support structure comprising a power drive rotational drive source, a rigid open support frame generally of rectangular box cross section in a longitudinal plane and providing two opposed spaced walls with longitudinally grooved and rigid transverse connecting casting portion and an exterior wall surface adapted rigidly to support and fixedly to mount a power translating device having a rotatable driven shaft, a drive shaft adapted to be mechanically coupled to said driven shaft, means for rotationally supporting said drive shaft in opposed and aligned apertures of said walls including a quick-acting clutch for mechanically connecting and disconnecting said source and said drive shaft for clutch-controlled rotational drive thereof by said source, a cam member on said drive shaft, and cooperating cam-follower-actuated contacts rigidly supported on said transverse portion of said frame and located by a longitudinal groove thereof in preselected spaced relation to said cam member for enabling precise electrical-contact circuit control in relation to at least one preselected rotational position of said drive shaft.

7. A power drive support structure comprising a power rotational drive source, a rigid open support casting generally of rectangular box cross section providing spaced end walls and including a rigid support bar interconnecting said walls and an exterior wall surface adapted rigidly to support and fixedly to mount a power translating device having a rotatable driven shaft, a drive shaft rotationally supported in aligned apertures of said end walls and adapted to be mechanically coupled to said driven shaft, a quick-acting clutch for mechanically connecting and disconnecting said source and said drive shaft for clutch-controlled rotational drive thereof by said source, a cam member on said drive shaft, and a unitary cooperating cam-follower-actuated contact structure assembled on a rigid bar member rigidly supported on said support bar for enabling electrical-contact circuit control in relation to at least one preselected rotational position of said drive shaft.

8. A power support structure comprising a power rotational drive source, an open support casting generally of rectangular longitudinal cross section having end walls and a rigid integrally cast support bar extending therebetween and providing an exterior wall surface adapted rigidly to support and fixedly to mount a power translating device having a rotatable driven shaft, said bar having a longitudinally grooved inner face and transverse spaced ribs on said face, a drive shaft adapted to be mechanically coupled to said driven shaft, means for rotationally supporting said drive shaft in aligned apertures of said end walls including a quick-acting clutch for mechanically connecting and disconnecting said source and said drive shaft for clutch-controlled rotational drive thereof by said source, a plurality of cam members positioned in spaced relation along said drive shaft, and a plurality of subassemblies each secured to said support bar by a support member having a tongue at one end received in a longitudinal groove of said support bar and oriented at said one end by at least one of said transverse ribs and each including an electrical contactor actuated by a cam follower member pivoted on said support member and positioned in cam follower operative relation to an individual one of said cam members.

References Cited by the Examiner

UNITED STATES PATENTS

| | | | |
|---|---|---|---|
| 1,617,991 | 2/1927 | Dowey | 200—92 X |
| 2,466,686 | 4/1949 | Connelly | 200—46 X |
| 2,571,818 | 10/1951 | Blodgett | 200—47 X |

KATHLEEN H. CLAFFY, *Primary Examiner.*

ROBERT K. SHAEFER, *Examiner.*

W. C. GARVERT, *Assistant Examiner.*